(12) United States Patent
Hwang

(10) Patent No.: US 9,166,431 B2
(45) Date of Patent: *Oct. 20, 2015

(54) BATTERY CHARGE CIRCUIT

(75) Inventor: Kyu Min Hwang, Gwangju (KR)

(73) Assignee: Green Powerset Co., LTD., Seoul (KR)

( * ) Notice: Subject to any disclaimer, the term of this patent is extended or adjusted under 35 U.S.C. 154(b) by 331 days.

This patent is subject to a terminal disclaimer.

(21) Appl. No.: 13/593,783

(22) Filed: Aug. 24, 2012

(65) Prior Publication Data

US 2013/0221900 A1  Aug. 29, 2013

(30) Foreign Application Priority Data

Aug. 24, 2011  (KR) .................. 10-2011-0084500
Aug. 29, 2011  (KR) .................. 10-2011-0086736

(51) Int. Cl.
*H02J 7/00*  (2006.01)

(52) U.S. Cl.
CPC ............. *H02J 7/0052* (2013.01); *H02J 7/0016* (2013.01)

(58) Field of Classification Search
CPC ......... H02J 7/0052; H02J 7/008; H02J 7/045; B06L 11/185; Y02T 10/705; Y02T 10/7241; Y02T 90/121; Y02T 90/127; Y02T 90/128

USPC .................. 320/106, 107, 116, 140, 152, 153
See application file for complete search history.

(56) References Cited

U.S. PATENT DOCUMENTS

| 2006/0113930 A1* | 6/2006 | Andriolo ......................... 318/66 |
| 2008/0136368 A1* | 6/2008 | Hajiaghajhani ............... 320/106 |
| 2009/0206797 A1* | 8/2009 | Chueh et al. .................. 320/150 |
| 2011/0006731 A1* | 1/2011 | Wang et al. .................... 320/109 |
| 2011/0115435 A1* | 5/2011 | Kikuchi ......................... 320/118 |
| 2012/0086399 A1* | 4/2012 | Choi ............................. 320/116 |

* cited by examiner

*Primary Examiner* — Vuthe Siek
(74) *Attorney, Agent, or Firm* — William Park & Associates Ltd.

(57) ABSTRACT

Provided is a battery charge circuit including a charging power supply unit configured to generate an internal voltage using an external power supply; a charging unit configured to measure voltages of first to fourth batteries, output measurement signals, and selectively charge at least one among the first to fourth batteries in response to charge control signals; and a control unit configured to select charging methods corresponding to the measurement signals among a plurality of charging methods stored therein, and generate the control signals corresponding to the charging methods.

9 Claims, 5 Drawing Sheets

BATTERY CHARGE CIRCUIT

BACKGROUND

1. Field of the Invention

The present invention relates to a charge circuit for a battery pack including a plurality of batteries connected in series, and more particularly, to cell-balancing for equalizing voltages of the plurality of batteries when the battery pack is charged.

2. Discussion of Related Art

When charging and discharging of batteries that are connected in series are repeated, voltages of the batteries become different due to different lifespan of the batteries. When batteries having different voltages are repeatedly charged and discharged, a battery, the performance of which deteriorates to a higher degree than the other batteries is over-discharged or over-charged, and is thus accelerated to deteriorate, thereby lowering the performance of a battery pack including the batteries. For effective use of the battery pack, degrees to which the batteries connected in series are charged/discharged should be controlled to be the same. Generally, to this end, the voltages of the batteries are equalized. This process is referred to as cell-balancing. The present invention suggests a method of satisfying such a need.

SUMMARY OF THE INVENTION

The present invention is directed to a battery charge circuit capable of charging a plurality of batteries connected in series to the same voltage, regardless of different characteristics of the plurality of batteries.

According to an aspect of the present invention, there is provided a battery charge circuit including a charging power supply unit configured to generate an internal voltage using an external power supply; a charging unit configured to measure voltages of first to fourth batteries, output measurement signals, and selectively charge at least one among the first to fourth batteries in response to charge control signals; and a control unit configured to select charging methods corresponding to the measurement signals among a plurality of charging methods stored therein, and generate the control signals corresponding to the charging methods.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
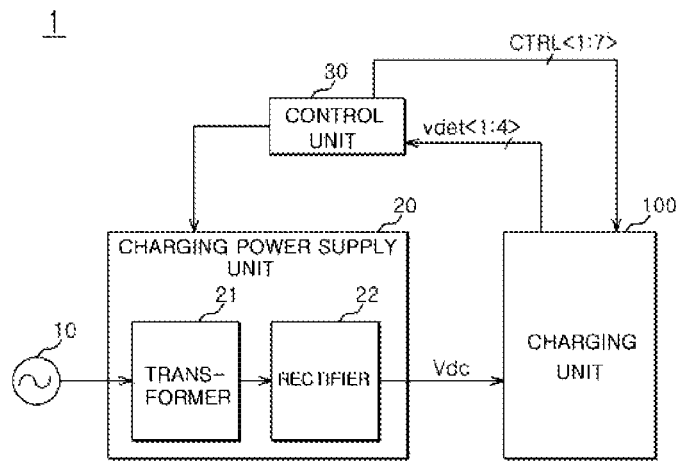
FIG. 1 is a block diagram of a battery charge circuit according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. Like reference numerals denote like elements throughout the drawings.

Referring to FIG. 1, a battery charge circuit 1 according to an exemplary embodiment of the present invention includes a charging power supply unit 20, a charging unit 100, and a control unit 30.

The charging power supply unit 20 is configured to generate an internal direct current (DC) voltage Vdc for charging by using an external alternate current (AC) voltage supply unit 10.

The charging power supply unit 20 includes a transformer 21 and a rectifier 22.

The transformer 21 is configured to transform a voltage of the external AC voltage power supply 10 into a voltage for battery charging.

The rectifier 22 is configured to rectify an output of the transformer 21, and generate an internal DC voltage Vdc.

A circuit of the charging unit 100 is configured based on a plurality of batteries (four batteries E1 to E4 in the current embodiment of FIG. 1) mounted therein.

The charging unit 100 measures voltages of the plurality of batteries E1 to E4, outputs measurement signals Vdet<1:4>, and begins charging of the plurality of batteries E1 to E4 such that the plurality of batteries E1 to E4 have the same voltage, according to charging modes corresponding to charge control signals CTRL<1:7>.

The charging unit 100 may selectively charge the plurality of batteries E1 to E4 in response to the charge control signals CTRL<1:7>.

The charging unit 100 may charge another battery using at least one among the plurality of batteries E1 to E4, or may charge all or some of the plurality of batteries E1 to E4 using the internal DC voltage Vdc, in response to the charge control signals CTRL<1:7>.

The control unit 30 is configured to generate the charge control signals CTRL<1:7> in response to the measurement signals Vdet<1:4>.

The control unit 30 may include a micro controller unit (MCU).

Charging modes corresponding to the voltages of the plurality of batteries E1 to E4 are programmed in the MCU of the control unit 30. Thus, the control unit 30 determines the voltages of the plurality of batteries E1 to E4 and charging modes corresponding to the voltages of the plurality of batteries E1 to E4 in response to the measurement signals Vdet<1:4>, and outputs the charge control signals CTRL<1:7> corresponding to the determined charging modes to the charging unit 100.

Figure 2:
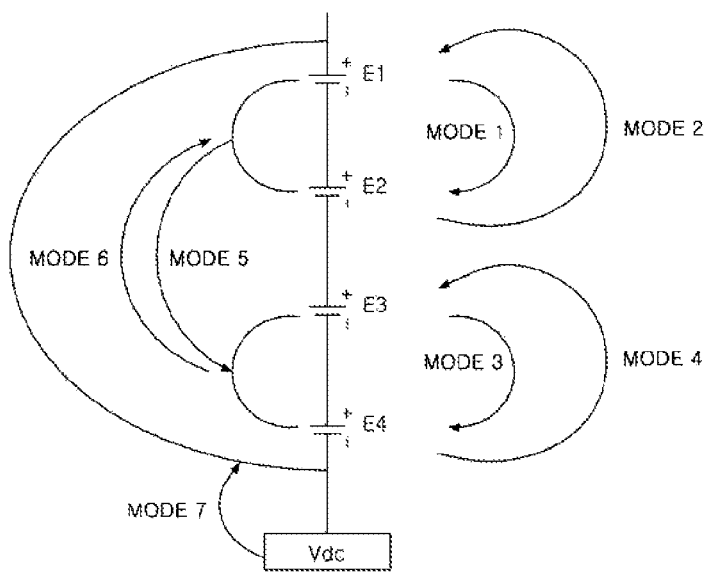
FIG. 2 is a diagram illustrating charging modes according to an exemplary embodiment of the present invention.

FIG. 2 is a diagram illustrating charging modes according to an exemplary embodiment of the present invention.

First, the current embodiment is directed to balancing between a plurality of batteries E1 to E4, i.e., equalizing charging voltages of the plurality of batteries E1 to E4.

To this end, a battery having a higher or lower voltage among the plurality of batteries E1 to E4 should be equalized with voltages of the other batteries. Thus, as illustrated in FIG. 2, according to the current embodiment, various charging modes, e.g., modes 1 to 7, may be selectively used based on the plurality of batteries E1 to E4.

In mode 1, the battery E2 is charged using the battery E1.
In mode 2, the battery E1 is charged using the battery E2.
In mode 3, the battery E4 is charged using the battery E3.
In mode 4, the battery E3 is charged using the battery E4.

In mode 5, the batteries E3 and E4 are charged using the batteries E1 and E2.

In mode 6, the batteries E1 and E2 are charged using the batteries E3 and E4.

In mode 7, all of the batteries E1 to E4 are charged using an internal DC voltage Vdc.

On the other hand, there are a number of cases of the differences between voltage characteristics of the plurality of batteries E1 to E4. Accordingly, according to an embodiment of the present invention, voltages of all of the batteries may be equalized using a charging method obtained from a selective combination of at least one mode among the charging modes described above, for each of the number of cases.

In other words, a plurality of charging methods, i.e., charging methods corresponding to the number of cases, are stored in the MCU of the control unit 30.

Operations (steps ① to ⑦) of the battery charge circuit 1 of FIG. 1 are described below.

① When the voltage of the battery E1 is higher than that of the battery E2, the battery charge circuit 1 operates in mode 1 until the voltages of the batteries E1 and E2 become equal to each other.

② When the voltage of the battery E2 is higher than that of the battery E1, the battery charge circuit 1 operates in mode 2 until the voltages of the batteries E1 and E2 become equal to each other.

③ When the voltage of the battery E3 is higher than that of the battery E4, the battery charge circuit 1 operates in mode 3 until the voltages of the batteries E3 and E4 become equal to each other.

④ When the voltage of the battery E4 is higher than that of the battery E3, the battery charge circuit 1 operates in mode 4 until the voltages of the batteries E3 and E4 become equal to each other.

⑤ When a voltage of the batteries E1 and E2 connected in series is higher than a voltage of the batteries E3 and E4 connected in series, the battery charge circuit 1 operates in mode 5 until the voltage of the batteries E1 and E2 becomes equal to the voltage of the batteries E3 and E4.

⑥ When the voltage of the batteries E3 and E4 connected in series is higher than the voltage of the batteries E1 and E2, the battery charge circuit 1 operates in mode 6 until the voltage of the batteries E1 and E2 becomes equal to the voltage of the batteries E3 and E4.

⑦ The voltages of the batteries E1 to E4 are equalized with the voltage of another battery charge circuit set (hereinafter referred to as 'module) according to mode 7.

Accordingly, according to the current embodiment, referring back to FIG. 1, the control unit 30 measures the voltages of the plurality of batteries E1 to E4 in response to the measurement signals Vdet<1:4>, and controls the charging unit 100 to operate according to the operations described above (steps ① to ⑦), thereby charging the plurality of batteries E1 to E4 to the same voltage.

Figure 3:
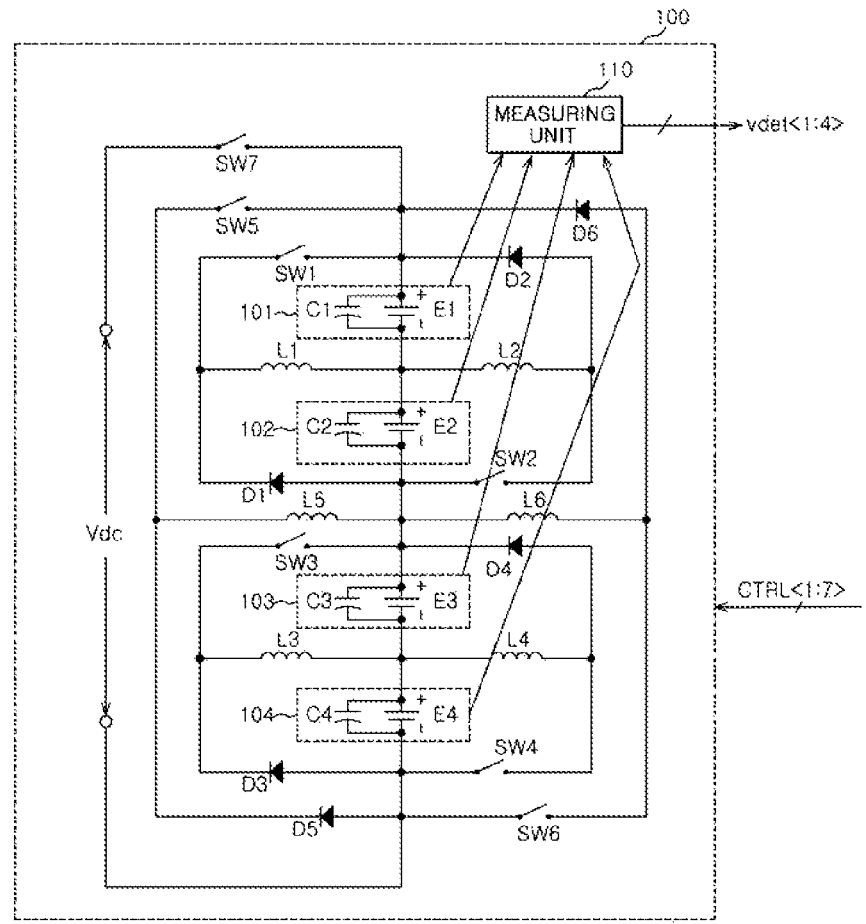
FIG. 3 is a circuit diagram of a charging unit of FIG. 1.

FIG. 3 is a circuit diagram of the charging unit 100 of FIG. 1.

Referring to FIG. 3, the charging unit 100 includes a plurality of charging cells 101 to 104, a measuring unit 110, and a plurality of charging paths.

The plurality of charging cells 101 to 104 include a plurality of batteries E1 to E4 and a plurality of capacitors C1 to C4.

The plurality of capacitors C1 to C4 are respectively connected to the plurality of batteries E1 to E4 so as to remove a smoothing effect, i.e., ripple current.

The measuring unit 110 is configured to measure voltages of the plurality of batteries E1 to E4, and generate measurement signals Vdet<1:4>. The measuring unit 110 may be embodied as an analog-to-digital converter (ADC). Thus, the measuring unit 110 transforms analog voltages of the plurality of batteries E1 to E4 into the measurement signals Vdet<1:4> in the form of digital values.

In this case, each of the measurement signals Vdet<1:4> may consist of at least two bits. For example, the measurement signal Vdet<1> may consist of at least two bits. As described above, since each of the measurement signals Vdet<1:4> consists of at least two bits, charging voltages of the plurality of batteries E1 to E4 may be thus divided according to a plurality of operations.

The plurality of charging modes are performed using a plurality of switches SW1 to SW7, a plurality of diodes D1 to D6, and a plurality of inductors L1 to L6.

Among the plurality of charging modes, a first charging mode is performed using the switch SW1, the diode D1, and the inductor L1.

A second charging mode is performed using the switch SW2, the diode D2, and the inductor L2.

A third charging mode is performed using the switch SW3, the diode D3, and the inductor L3.

A fourth charging mode is performed using the switch SW4, the diode D4, and the inductor L4.

A fifth charging mode is performed using the switch SW5, the diode D5, and the inductor L5.

A sixth charging mode is performed using the switch SW6, the diode D6, and the inductor L6.

A seventh charging mode is performed using the switch SW7.

The plurality of switches SW1 to SW7 are controlled by the charge control signals CTRL<1:7>. In this case, the plurality of switches SW1 to SW7 are controlled by the charge control signals CTRL<1:7>, respectively. That is, the switch SW1 is controlled by the charge control signal CTRL<1>, the switch SW2 is controlled by the charge control signal CTRL<2>, and the switch SW7 is controlled by the charge control signal CTRL<7>.

Figure 4:
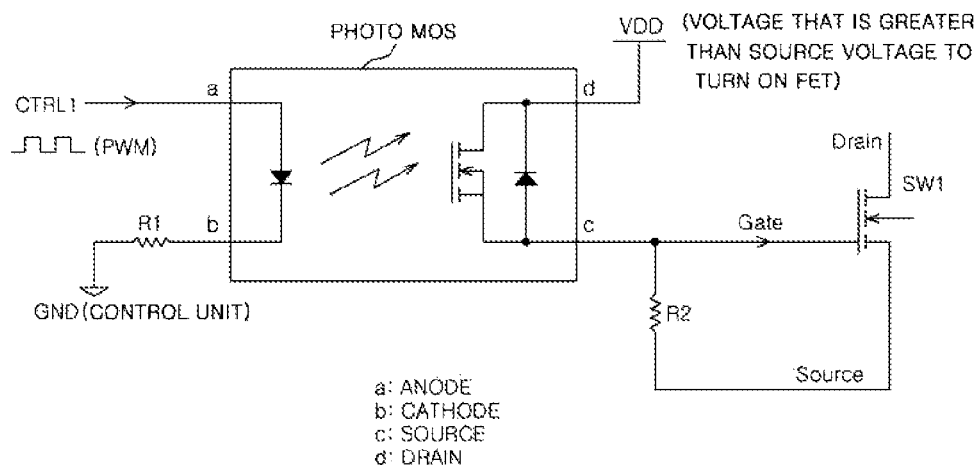
FIG. 4 is a circuit diagram of a control signal driver according to an exemplary embodiment of the present invention.

FIG. 4 is a circuit diagram of a control signal driver according to an exemplary embodiment of the present invention.

The plurality of switches SW1 to SW7 may be configured using various switching devices, e.g., field effect transistors (FETs).

When the plurality of switches SW1 to SW7 are configured using FETs, electric potentials for controlling the FETs may be different from those of the charge control signals CTRL<1:7>. Thus, a driver is required to supply the charge control signals CTRL<1:7> to the FETs. An example of a circuit using a photo metal-oxide semiconductor (MOS), which is a type of optical switching device, as a driver for controlling the switch SW1, is illustrated in FIG. 4.

Alternatively, any of various other optical switching devices, e.g., a photo coupler, may be used instead of the photo MOS.

The control signals CTRL<1:7> may be pulse width modulation (PWM)-based pulse signals (hereinafter referred to as 'PWM pulse signals').

As illustrated in FIG. 4, one end of the photo MOS facing a light-emitting device (not shown) is connected between an output terminal of the control unit 30 via which the charge control signal CTRL<1> is output and a ground terminal GND of the control unit 30, and another end of the photo MOS facing a light-receiving device (not shown) is connected between a power supply voltage terminal VDD and a gate terminal of the switch SW1.

Figure 5:
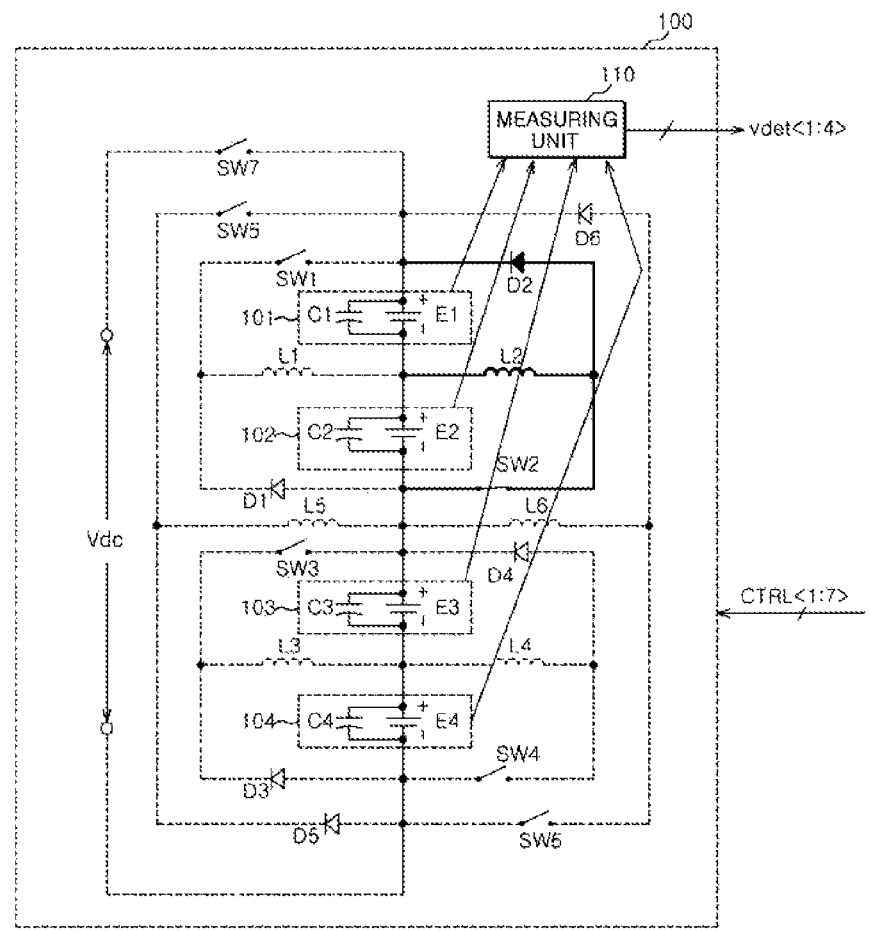
FIGS. 5 to 7 are circuit diagrams illustrating operations of a battery charge circuit in charging mode(s) according to exemplary embodiments of the present invention.
Figure 6:
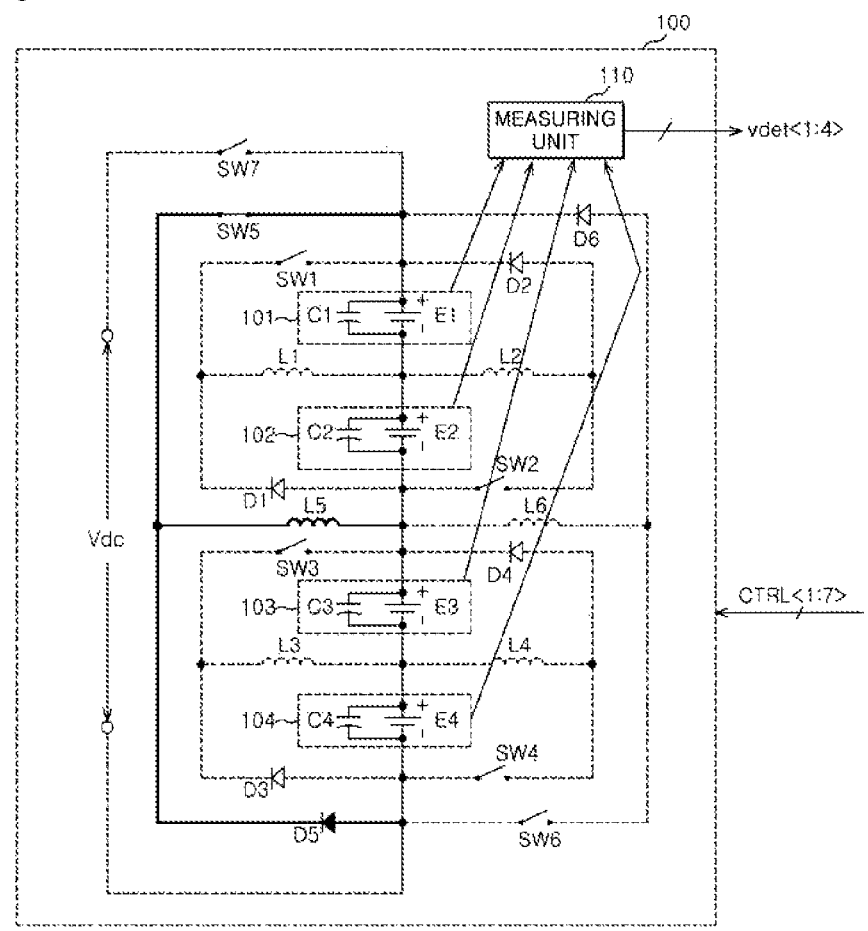
Figure 7:
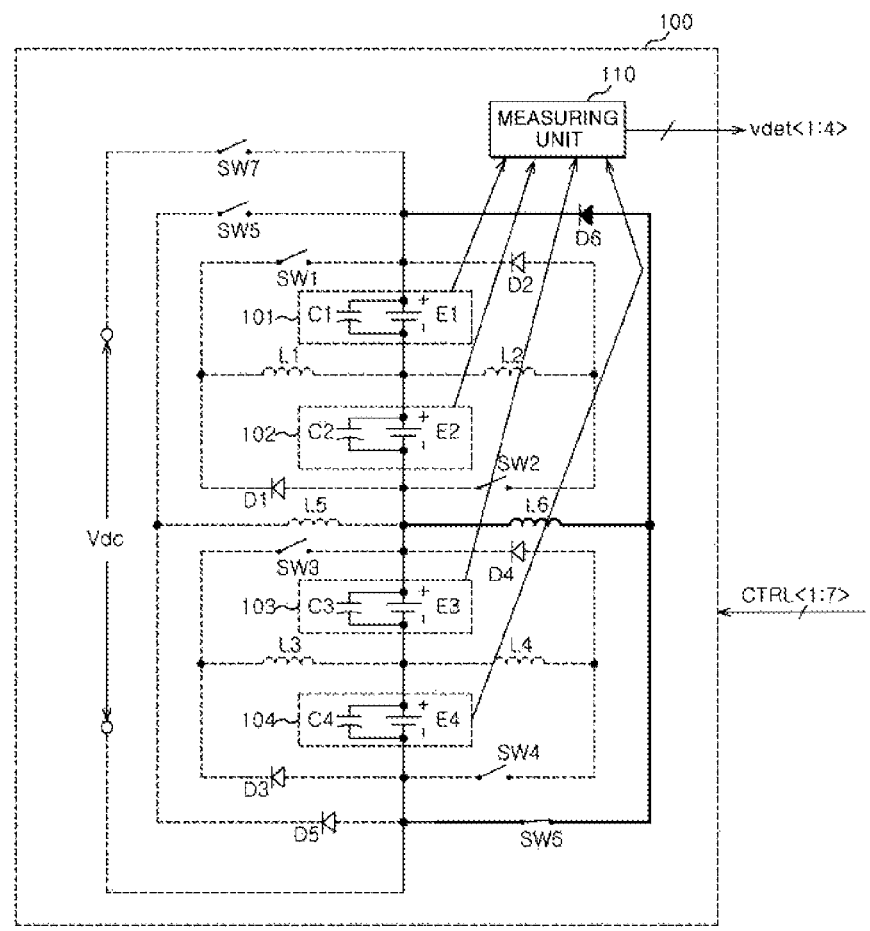

FIGS. 5 to 7 are circuit diagrams illustrating operations of the battery charge circuit 1 of FIG. 1 in charging mode according to exemplary embodiments of the present invention.

FIG. 5 illustrates mode 2 among various charging modes. In FIG. 5, solid lines indicate circuits and devices for performing mode 2.

When mode 2 is selected as illustrated in FIG. 5, a switch SW2 is repeatedly turned on and off in response to a control signal CTRL<2> that is a PWM pulse signal.

While the switch SW2 is turned on, current of a battery E2 is stored in an inductor L2 in the form of magnetic energy.

Then, when the switch SW2 is turned off, the magnetic energy stored in the inductor L2 is transformed into electrical energy, i.e., current, and a battery E1 is charged with the electrical energy via a diode D2.

FIG. 6 illustrates mode 5 among various charging modes. In FIG. 6, solid lines indicate circuits and devices for performing mode 5.

When mode 5 is selected as illustrated in FIG. 6, a switch SW5 is repeatedly turned on and off in response to a control signal CTRL<5> that is a PWM pulse signal.

While the switch SW5 is turned on, current of two batteries E1 and E2 is stored in an inductor L5 in the form of magnetic energy.

Then, when the switch SW5 is turned off, the magnetic energy stored in the inductor L5 is transformed into electrical energy, i.e., current, and two batteries E3 and E4 are charged with the electrical energy via a diode D5.

FIG. 7 illustrates mode 6 among various charging modes. In FIG. 7, solid lines indicate circuits and devices for performing mode 6.

When mode 6 is selected as illustrated in FIG. 7, a switch SW6 is repeatedly turned on and off in response to a control signal CTRL<6> that is a PWM pulse signal.

While the switch SW6 is turned on, current of two batteries E3 and E4 is stored in an inductor L6 in the form of magnetic energy.

Then, when the switch SW6 is turned off, the magnetic energy stored in the inductor L6 is transformed into electrical energy, i.e., current, and two batteries E1 and E2 are charged with the electrical energy via a diode D6.

There is a case in which standards for a commercial monitoring chip for measuring voltage in a battery management system (BMS) are determined based on eight batteries.

A battery charge circuit according to an exemplary embodiment of the present invention is designed based on four batteries, and thus may be efficiently applied to the BMS.

According to the above embodiments, a plurality of batteries that are connected in series may be selectively charged, and all of the plurality of batteries may be thus charged to the same voltage, thereby increasing battery efficiency.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents. The exemplary embodiments set forth herein should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A battery charge circuit comprising:
    a charging power supply unit configured to generate an internal voltage using an external power supply;
    a charging unit configured to measure voltages of a plurality of batteries, output measurement signals, and selectively charge at least one among the batteries in response to charge control signals; and
    a control unit configured to select one of a plurality of charging methods corresponding to the measurement signals, and generate the charge control signals corresponding to the selected charging method,
    wherein each one of the charging methods comprises an execution of a selective combination of at least one of a plurality of charging modes for the batteries in a sequence.

2. The battery charge circuit of claim 1, wherein the charging unit comprises:
    first to fourth charging cells configured to accommodate the first to fourth batteries therein;
    a measuring unit configured to measure the voltages of the first to fourth batteries and generate the measurement signals; and
    circuits to configure first to seventh charging modes, to be selectively connected to the first to fourth batteries, and to be open in response to the charge control signals.

3. The battery charge circuit of claim 2, wherein some of the circuits that configure the first to seventh charging modes are configured to charge another battery using at least one of the first to fourth batteries.

4. The battery charge circuit of claim 2, wherein some of the circuits that configure the first to seventh charging modes are configured to charge some or all of the first to fourth batteries using the internal voltage.

5. The battery charge circuit of claim 3, wherein some of the circuits that configure the first to seventh charging modes comprise a switch and an inductor connected between a cathode of one battery and an anode of another battery among the first to fourth batteries.

6. The battery charge circuit of claim 1, further comprising a driver configured to transmit the charge control signals to the charging unit.

7. The battery charge circuit of claim 6, wherein the driver comprises an optical switching device.

8. The battery charge circuit of claim 1, wherein the control unit is configured to provide the charge control signals in the form of pulse width modulation (PWM) signals.

9. The battery charge circuit of claim 1, wherein the plurality of charging modes comprise:
    a first mode in which the second battery is charged using the first battery;
    a second mode in which the first battery is charged using the second battery;
    a third mode in which the fourth battery is charged using the third battery;
    a fourth mode in which the third battery is charged using the fourth battery;
    a fifth mode in which the third and fourth batteries are charged using the first and second batteries;
    a sixth mode in which the first and second batteries are charged using the third and fourth batteries; and
    a seventh mode in which the first to fourth batteries are charged using the internal voltage.

* * * * *